United States Patent [19]
Okamoto

[11] Patent Number: 5,440,404
[45] Date of Patent: Aug. 8, 1995

[54] IMAGE SIGNAL COMPRESSION APPARATUS AND METHOD USING VARIABLE LENGTH ENCODING

[75] Inventor: Ichiro Okamoto, Yokohama, Japan

[73] Assignee: Matsushita Electric Industrial Co., Ltd., Osaka, Japan

[21] Appl. No.: 181,175

[22] Filed: Jan. 13, 1994

[30] Foreign Application Priority Data

Jan. 18, 1993 [JP] Japan .................. 5-005583

[51] Int. Cl.⁶ .............................................. H04N 1/41
[52] U.S. Cl. .................. 358/432; 358/261.1; 358/426; 358/427; 341/67
[58] Field of Search ............ 358/426, 261.1, 427, 358/432, 433; 348/405, 423; 382/56; H04N 1/41; 341/65, 67, 106

[56] References Cited

U.S. PATENT DOCUMENTS

| | | | |
|---|---|---|---|
| 4,984,076 | 1/1991 | Watanabe et al. | 348/405 |
| 5,068,744 | 11/1991 | Ito . | |
| 5,101,280 | 3/1992 | Moronega et al. | 358/426 |
| 5,138,316 | 8/1992 | Konishi | 341/67 |
| 5,216,516 | 6/1993 | Tanaka et al. | 358/426 |
| 5,245,427 | 9/1993 | Kunihiro | 348/409 |
| 5,249,066 | 9/1993 | Fukuda et al. | 358/427 |
| 5,253,078 | 10/1993 | Balkanski et al. | 358/426 |
| 5,295,077 | 3/1994 | Fukuoka | 358/427 |

FOREIGN PATENT DOCUMENTS

| | | |
|---|---|---|
| 0327931A2 | 8/1989 | European Pat. Off. . |
| 0469835A2 | 2/1992 | European Pat. Off. . |
| 0517141A2 | 12/1992 | European Pat. Off. . |

OTHER PUBLICATIONS

Yasuda, "Standardization Activities on Multimedia Coding in ISO", Signal Processing Image Communication, vol. 1, No. 1, Jun. 1983, pp. 3–16.

Liebhold, et al., "Toward an Open Environment for Digital Video", Communications of the Association for Computing Machinery, vol. 34, No. 4, Apr. 1991, pp. 103–112.

Yoneda, et al., "An Experimental Digital VCR with New DCT-based Bit-Rate Reduction System", IEEE Transactions on Consumer Electronics, vol. 37, No. 3, Aug. 1991, pp. 275–282.

Wallace, et al., "The JPEG Still Picture Compression Standard", IEEE Transactions on Consumer Electronics, vol. 38, No. 1, Feb. 1992, pp. XVIII–XXXIV.

Aravind, et al., "Image and Video Coding Standards", AT&T Technical Journal, vol. 72, No. 1, Jan. 1993, pp. 67–89.

"Understanding and Application of Image Data Compression", Interface magazine, Dec. 12, 1991, pp. 177, 180 and 204–208.

"How Tapeless Edit System Will be Developed?", Video magazine, Oct. 1991, pp. 27–32.

"Video and Still Image Comrpession", Knowledge Industry Publications, Inc., Apr. 1992, pp. S–16, S–25, S–27 and S–28.

Primary Examiner—Edward L. Coles, Sr.
Assistant Examiner—Kim Yen Vu
Attorney, Agent, or Firm—Stevens, Davis, Miller & Mosher

[57] ABSTRACT

A transform unit obtains a discrete cosine coefficient by processing an image signal in a discrete cosine transform fashion per unit of a predetermined data amount. A memory includes therein a plurality of quantization tables corresponding to quantization accuracies different from each other, and a memory includes therein a variable length coding table. A quantization unit quantizes the discrete cosine coefficient with reference to a selected one of the plurality of quantization tables. An encoding unit obtains encoded data by processing the quantized discrete cosine coefficient in a variable length coding fashion. A code amount adding unit obtains total amount data indicative of a total amount of the encoded data corresponding to the predetermined data amount. The encoded data, the total amount data and table identification data corresponding to a selected one of the plurality of quantization tables are temporarily stored in an FIFO memory and these data are read out therefrom as a compression code in a predetermined order.

20 Claims, 3 Drawing Sheets

IMAGE SIGNAL COMPRESSION APPARATUS AND METHOD USING VARIABLE LENGTH ENCODING

CROSS-REFERENCE TO RELATED APPLICATION

The present application relates to U.S. patent application Ser. No. 08/157,643 entitled "VIDEO SIGNAL CODE SIZE CONTROL APPARATUS" filed Nov. 24, 1993 in the name of Kazuo Kajimoto et al. assigned to the same assignee of this application, the disclosure of which is hereby incorporated by reference.

BACKGROUND OF THE INVENTION

The present invention relates to an image signal compression apparatus for use in a recording and transmitting apparatus for recording and transmitting an image in the form of compressed data or the like. More particularly, this invention relates to an image signal compression apparatus suitable for recording and reproducing a moving image of a moving image edit apparatus in the compressed form in a real time.

The standardization of an image compression method has been made in recent image processing apparatus. As the standardization of the image compression method, a JPEG (Joint Picture Expert Group) system (JPEG standard (JPEG-9-R7) is determined and utilized (see special number "Understanding and Application of Image data compression" of magazine "INTERFACE" Dec. 12, 1991, published by CQ publishing Inc., pp. 177,180 and 204–208). Further, circuit elements (LSIs) (LSIs manufactured by LSI Logic Corp., under the trade names of L64765, L64735 and L64745 and LSI manufactured by C-Cube Corp., under the trade name of CL550) in which the JPEG can be applied to NTSC or PAL television moving pictures in a real time fashion are now developed. On the other hand, in the video edit field, it is customary that the editing of image is carried out by using video tapes. Recently, an apparatus which can considerably reduce edit work time by recording a video signal based on the JPEG in the form of compressed data and instantly reproducing the recorded video signal randomly has received a remarkable attention (see special number "How Tapeless Edit system will be developed?" of a magazine entitled "VIDEO α", Oct. 1991, published by Photographic Industry Publishing Inc., pp. 27–32 and Educational Report April 1992, "VIDEO AND STILL IMAGE COMPRESSION", published by Knowledge Industry Publications Inc., pp. S-16, S-25, S-27 and S-28).

Figure 4:
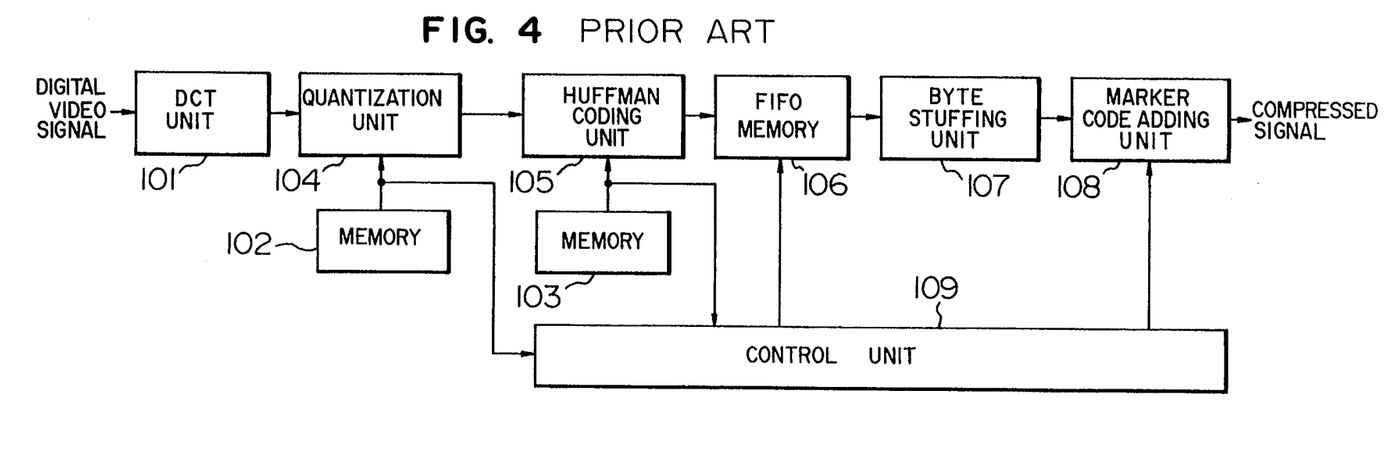
FIG. 4 is a block diagram showing an encoding unit of a conventional image signal compression apparatus.
Figure 5:
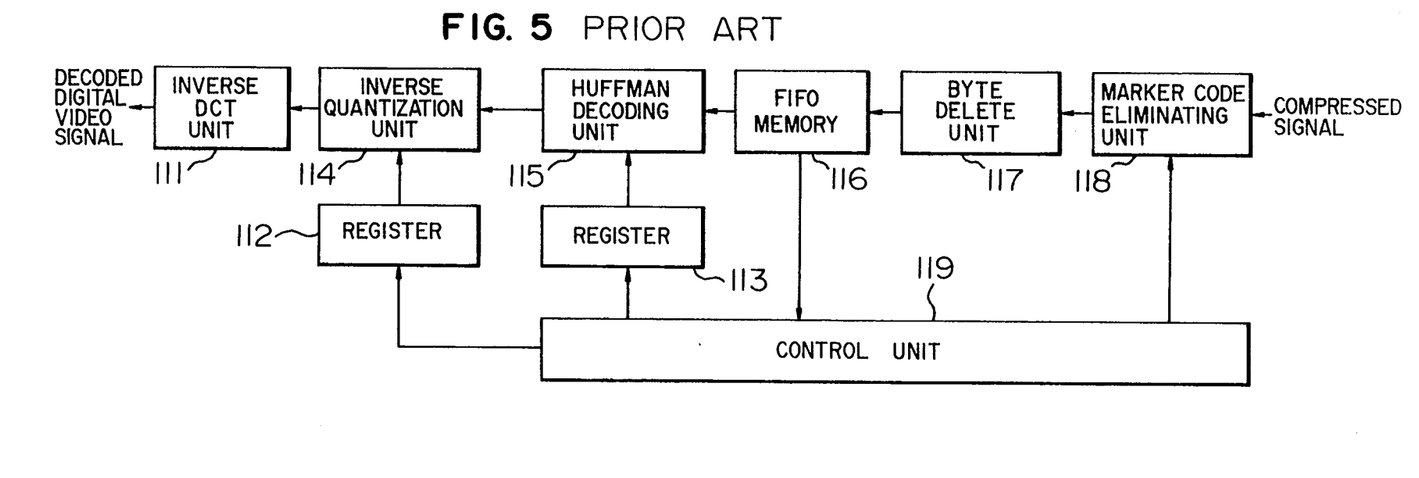
FIG. 5 is a block diagram showing a decoding unit of the conventional image signal compression apparatus.

Encoding and decoding in the JPEG will be described with reference to FIGS. 4 and 5. FIG. 4 is a block diagram showing an encoding unit of a conventional compression apparatus based on the standard JPEG. FIG. 5 is s block diagram showing a decoding unit of such a conventional compression apparatus.

As shown in FIG. 4, the encoding unit of the conventional compression apparatus comprises a discrete cosine unit (DCT unit) 101, a memory 102 for storing therein one quantization table (Q table) corresponding to a predetermined quantization accuracy, a memory 103 for storing therein a Huffman coding table, a quantizing unit 104, a Huffman coding unit 105, an FIFO (first-in first-out) memory 106, a byte stuffing unit 107, a marker code adding unit 108 and a control unit 109 for controlling the aforesaid units.

Operation of the encoding unit of this conventional image signal compression apparatus will be described.

The discrete cosine transform unit 101 obtains a discrete cosine coefficient (DCT coefficient) by processing a digital video signal in a discrete cosine transform fashion. That is, the digital video signal is converted into a spatial frequency component. The quantizing unit 104 quantizes the discrete cosine coefficient with reference to the quantization table stored in the memory 102. The Huffman coding unit 105 obtains coded data by coding the discrete cosine coefficient quantized by the quantizing unit 104 into a Huffman code with reference to the Huffman coding table stored in the memory 103. The encoded data is temporarily stored in the FIFO memory 106. The quantization table and the Huffman coding table also are temporarily stored in the FIFO memory 106 through the control unit 109. The coded data, the quantization table and the Huffman coding table stored in the FIFO memory 106 are read out therefrom at a constant interval in a predetermined order and then transmitted to the byte stuffing unit 107.

The byte stuffing unit 107 inserts data "00", which will be described later, into the data read out from the FIFO memory 106. The JPEG system determines marker codes which indicate the starting portion of the code, the ending portion of the code, the Q table or the like. The marker code is represented by data "FFxx" (xx are data other than data 00) of 16 bits. In this case, since the JPEG code (the encoded data) is a variable length code and whose one portion frequently becomes "FF", data "FF" in the encoded data cannot be discriminated from the marker code. Therefore, the code string of the encoded data is separated at the unit of 8 bits so that, when the value thereof is "FF", the identification data "00" are inserted into the last of the code by the byte stuffing unit 107. Accordingly, the marker code is "FFxx" (xx are data other than the data 00) and therefore can be discriminated from the code.

Then, the marker code adding unit 108 adds the marker code to output data of the byte stuffing unit 107 and then outputs the data added with the marker code as a compression code.

As shown in FIG. 5, the decoding unit of the conventional compression apparatus includes an inverse discrete cosine transform unit (inverse DCT unit) 111, registers 112 and 113, an inverse quantizing unit 114, a Huffman decoding unit 115, an FIFO memory 116, a byte delete unit 117, a marker code eliminating unit 118 and a control unit 119 for controlling the aforesaid respective units.

Operation of the decoding unit in the conventional image signal compression apparatus will be described below.

The maker code eliminating unit 118 eliminates the marker code from the above-mentioned compression code. The byte delete unit 117 eliminates the data "00" inserted by the byte stuffing unit 107. More specifically, data "FF" are detected by the marker code eliminating unit 118 and the byte delete unit 117. If the next data are "00", then the data "00" are deleted. If on the other hand, the next data are other than the data "00", then the data "FF" and the succeeding code string (corresponding to the marker code) are eliminated. The compression code from which the marker code and the data "00" inserted by the byte stuffing unit 107 are eliminated is temporarily stored in the FIFO memory 116. Of data stored in the FIFO memory 116, the quantization table and the Huffman coding table are respectively transferred through the control unit 119 to the registers 112 and 113. The coded data of the data stored in the FIFO memory 116 is transmitted to the Huffman decoding unit 115. The Huffman decoding unit 115 obtains Huffman decoded data by processing the coded data in a Huffman decoding fashion with reference to the Huffman coding table (or a Huffman coding/decoding table corresponding to the Huffman coding table) transferred to the register 113. The inverse quantizing unit 114 obtains a decoded discrete cosine coefficient by processing the Huffman decoded data in an inverse quantization fashion with reference to the quantization table transferred to the register 112. The inverse discrete cosine transform unit 111 obtains a digital video signal by processing the decoded discrete cosine coefficient in an inverse discrete cosine transform fashion.

SUMMARY OF THE INVENTION

The aforesaid conventional image signal compression apparatus can set a variety of marker codes and is effective in general-purpose property and in maintaining compatibility. This conventional image signal compression apparatus, however, encounters the following drawbacks:

(1) The amount of data "FF" in the code string depends upon an input image and, it is frequently observed that a coding amount is considerably increased by marker code processing including byte stuffing processing. Therefore, a code amount of one picture cannot be predicted before the encoding processing. As a result, when a moving picture is compressed and recorded in a real time fashion, a transfer rate of an image recording apparatus (image recording medium) becomes temporarily insufficient so that data of a certain frame cannot be recorded frequently;

(2) Since a 128-byte Q table and a 5440-byte Huffman coding table must be recorded together with the marker code in order to maintain compatibility, it is unavoidable that the compression ratio is lowered; and (3) A decision step of the data "FF" and an adding process of the data "00" are required upon encoding so that marker code decoding processing is required during upon decoding processing. This marker code decoding processing cannot be neglected from a money standpoint.

An object of the present invention is to provide an excellent image signal compression apparatus and a method thereof in which a compression ratio can be increased and the encoding and decoding can be carried out by simple processing and in which an image signal can be compressed efficiently, for being thereby recorded and reproduced.

To attain the aforesaid object, an image signal compression apparatus according to an aspect of the present invention comprises an encoding unit and/or decoding unit.

The encoding unit includes a discrete cosine transform unit for obtaining a discrete cosine coefficient by processing an image signal at the unit of a predetermined data amount in a discrete cosine transform fashion; a first memory unit for storing therein a plurality of quantization tables corresponding to quantization accuracies different from each other; a second memory unit for storing therein a variable length coding table; a quantization unit for quantizing the discrete cosine coefficient with reference to a selected one of the plurality of quantization tables; an encoding unit for obtaining encoded data by processing the discrete cosine coefficient quantized by the quantization unit in a variable length coding fashion with reference to the variable length coding table; a unit for obtaining total amount data indicative of a total amount of encoded data corresponding to the predetermined data amount; a third memory unit for storing therein table identification data corresponding to a selected one of the encoded data, the total amount data and the plurality of quantization tables, and a unit for reading out the table identification data, the total amount data and the encoded data from the third memory unit as a compression code in a predetermined order.

The decoding unit includes a fourth memory unit for temporarily storing the compression code; a first read unit for reading out the table identification data of the compression code stored in the fourth memory unit; a second read unit for reading out the total amount data of the compression codes stored in the fourth memory unit and which is the total amount data associated with the table identification data read out by the first read unit; a selecting unit for selecting one data set corresponding to the table identification data read out by the first read unit from the plurality of quantization tables; an identifying unit for identifying the encoded data of the compression codes stored in the fourth memory unit and which are the encoded data associated with the table identification data read out from the first read unit on the basis of the total amount data read out from the second read unit; a fifth memory unit for storing therein a decoded table corresponding to the variable length coding table; a decoding unit for obtaining decoded data by decoding the encoded data identified by the identifying unit; an inverse quantization unit for obtaining a decoded discrete cosine coefficient by processing the decoded data in an inverse quantization fashion with reference to the quantization table selected from the plurality of quantization tables by the selecting unit; and a unit for obtaining a decoded image signal by processing the discrete cosine coefficient in an inverse discrete cosine transform fashion.

The compression code provided by the above-mentioned image signal compression apparatus is comprised of the coded data, the total amount data and the table identification data, and the identification data "00" is not added into the coded data, unlike the compression code provided by the conventional apparatus. Therefore, according to the image signal compression apparatus, although the coded data is a variable length code, an amount of compression codes per picture can be predicted to some extent. Thus, when a moving picture is compressed and recorded in a real time fashion, it is possible to prevent such an accident in which a transfer rate of an image recording apparatus (image recording medium) cannot be made sufficient temporarily so that data of a given frame cannot be recorded.

Further, according to the image signal compression apparatus, since the identification data "00", the marker code, the quantization table and the Huffman coding table per se are not included in the compression code, the data compression rate is high. Accordingly, an encoding effect relative to the same picture quality is high as compared with the aforementioned conventional image signal compression apparatus. Also from this standpoint, it is possible to further reduce the possibility that the transfer rate of the image recording apparatus (image recording medium) is temporarily made insufficient so that data of frame cannot be recorded.

Furthermore, according to the image signal compression apparatus, since the identification data "00" and the marker code are not included in the compression codes, the processing required with respect to the identification data "00" and the marker code according to the prior art becomes unnecessary. Therefore, the circuit arrangement of the image signal compression apparatus can be simplified and the image signal compression apparatus can be made inexpensive.

Incidentally, in the image signal compression apparatus, although the encoded data is a variable length code, the compression code includes the total amount data. Thus, when the compression code is decoded the encoded data can be identified from the compression codes by using the total amount data.

DESCRIPTION OF THE PREFERRED EMBODIMENTS

An image signal compression apparatus and a method thereof according to the present invention will hereinafter be described with reference to the accompanying drawings.

Figure 1:
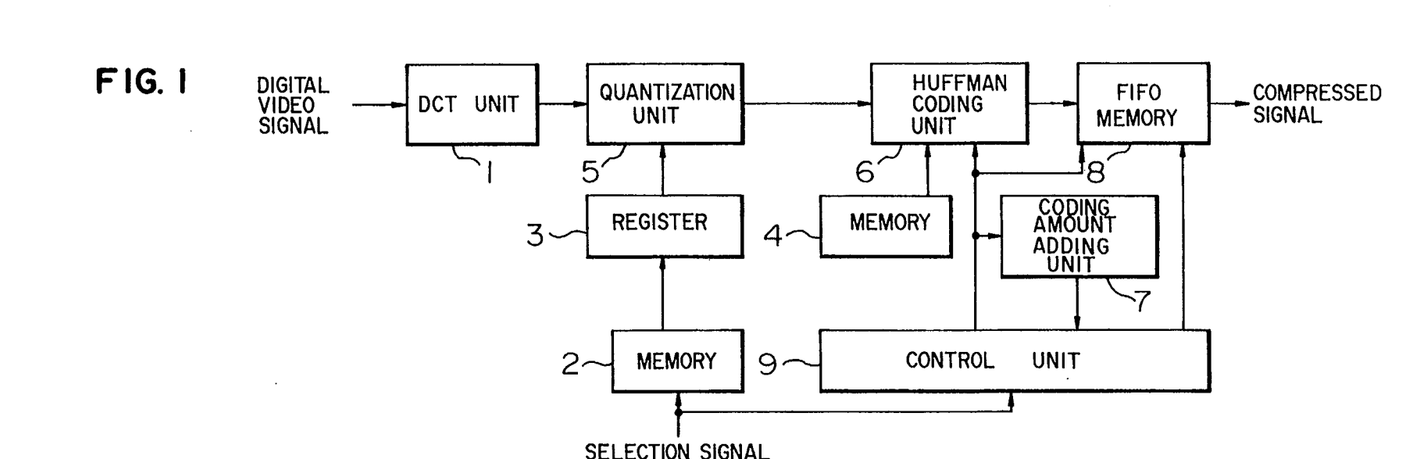
FIG. 1 is a block diagram showing an example of an encoding unit of an image signal compression apparatus according to an embodiment of the present invention.

FIG. 1 is a block diagram showing an example of an encoding unit of an image signal compression apparatus according to an embodiment of the present invention.

As shown in FIG. 1, an encoding unit of the image signal compression apparatus includes a discrete cosine transform unit (DCT unit) 1, a memory 2 for storing therein a plurality of quantization tables (Q tables) corresponding to quantization accuracies different from each other, a register 3 to which one of the plurality of quantization tables is transferred in response to a selection signal, a memory 4 for storing therein a Huffman coding table, a quantization unit 5, a Huffman coding unit 6, a coding amount adding unit 7, an FIFO memory 8 and a control unit 9 for controlling the foregoing respective units.

Operation of the encoding unit of this image signal compression apparatus will be described below.

The discrete cosine transform unit 1 obtains a discrete cosine coefficient (DCT coefficient) by processing a digital video signal per unit (the unit is one field picture in this embodiment, but other unit may be used) of a predetermined data amount in a discrete cosine transform fashion, i.e., the digital video signal is converted into a spatial frequency component. The quantization unit 5 quantizes the discrete cosine coefficient with reference to a selected one (one quantization table transferred to the register 3) of the plurality of quantization tables. The selection signal may fix the selection of the quantization table in a previously-set condition or may change the selection of the quantization table in response to the coding amount or the like during processing. During the vertical blanking period of the NTSC television video signal, for example, one of the plurality of quantization tables stored in the memory 2 is transferred to the register 3. The Huffman coding unit 6 obtains encoded data by processing the discrete cosine coefficient quantized by the quantization unit 5 in a Huffman coding fashion with reference to the Huffman coding table stored in the memory 4. The encoded data is temporarily stored in the FIFO memory 8.

The coding amount adding unit 7 counts a pulse-shaped transfer control signal (the encoded data of the predetermined amount is transferred from the Huffman coding unit 6 to the FIFO memory 8 at every pulse of this transfer control signal) supplied from the control unit 9 to the Huffman coding unit 6. A count value of the coding amount adding unit 7 is supplied to the control unit 9. The control unit 9 latches the count value from the coding amount adding unit 7 at every field picture unit (e.g. unit of the predetermined data amount) and resets the count value of the coding amount adding unit 7. Accordingly, the count value latched in the control unit 9 indicates a total amount of encoded data corresponding to the predetermined data amount. The count value thus latched is transferred to and temporarily stored in the FIFO memory 8 as total amount data indicative of the total amount of the encoded data corresponding to the predetermined data amount.

The data corresponding to the selection signal is transferred to and temporarily stored in the FIFO memory 8 through the control unit 9 as the total amount data indicative of the total amount of the encoded data corresponding to the predetermined data amount.

Figure 3:
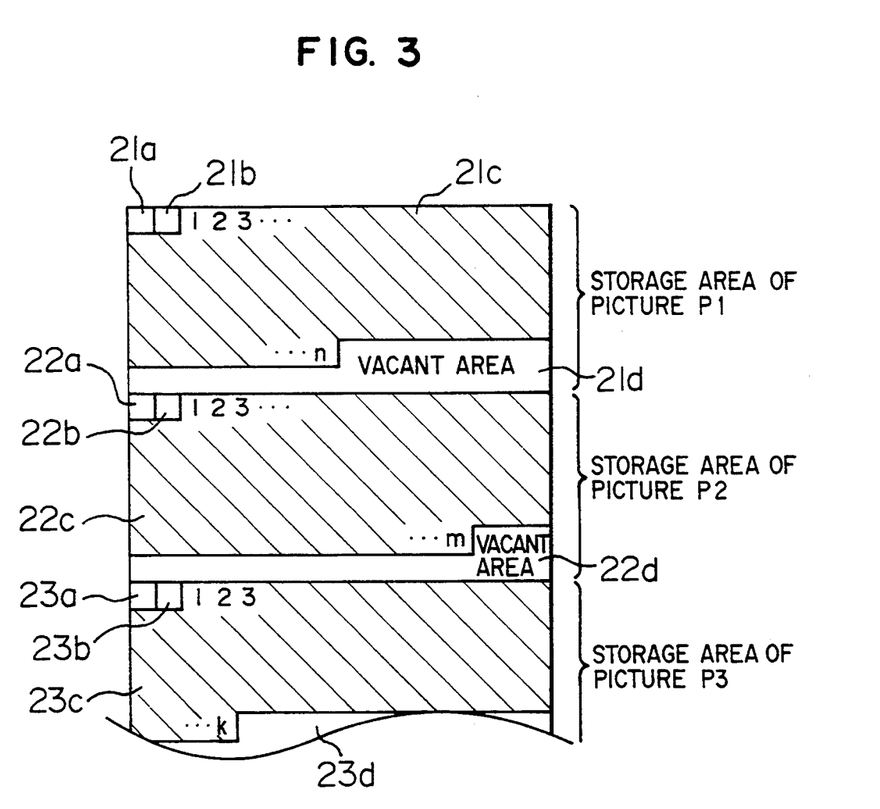
FIG. 3 is a schematic diagram showing an example of a format of data stored in an FIFO memory used in the image signal compression apparatus according to the embodiment of the present invention.

An example of the format of data stored in the FIFO memory 8 will be described next with reference to FIG. 3. In the FIFO memory 8, there are determined in advance storage areas corresponding to respective pictures (e.g. corresponding to the digital image signal of a predetermined data amount) of the digital image signal. The sizes of the respective storage areas are the same and the size and address thereof are determined in advance. As shown in FIG. 3, the storage areas corresponding to the respective pictures are continued in the sequential order of a storage area of a picture P1, a storage area of a picture P2, . . . In the storage area corresponding to the picture P1, there are stored table identification data 21a corresponding to the picture P1, total amount data 21b corresponding to the picture P1 and encoded data 21c corresponding to the picture P1, in that order. The sequential order may be changed freely inasmuch as it is determined in advance. In a remaining portion 21d of the storage area corresponding to the picture P1, there is stored no useful data and hence the remaining portion 21d is a so-called vacant area. Similarly, in the storage area corresponding to the picture P2, there are stored table identification data 22a corresponding to the picture P2, total amount data 22b corresponding to the picture P2 and encoded data 22c corresponding to the picture P2, in that order. In a remaining portion 22d of the storage area corresponding to the picture P2, there is stored no useful data, and hence the remaining portion 22d is a vacant area. Similarly, in the storage area corresponding to the picture P3, there are stored table identification data 22a corresponding to the picture P3, total amount data 22b corresponding to the picture P3 and encoded data 22c corresponding to the picture P3, in that order. In a remaining portion 23d of the storage area corresponding to the picture P3, there is stored no useful data, and hence the remaining portion 23d is a vacant area. Although the table identification data 21a, 22a, 23a and the total amount data 21b, 22b, and 23b are fixed length data, the encoded data 21c, 22c and 23c are variable length data. As shown in FIG. 3, if the total amount of the encoded data 21c is n bytes, then the total amount data 21b represents n bytes. If the total amount of the encoded data 22c is m bytes, then the total amount data 22b represents m bytes. If the total amount of the encoded data 23c is k bytes, then the total amount data 23b represents k bytes. The above-mentioned control unit 9 controls the respective elements in FIG. 1 so the respective data are stored as described above.

Subsequently, the respective data stored in the FIFO memory 8 are sequentially read out as compression data by controlling the FIFO memory 8 by the control unit 9. In this embodiment, the respective data are read out from the FIFO memory 8 in the sequential order of 21a, 21b, 21c, 21d, 22a, . . .

The above-mentioned compression code can be used as a recording signal of a hard disk or the like, for example, and a data transmission signal. Therefore, the encoding unit shown in FIG. 1 can be used as a part of an image data recording apparatus and an image data transmission apparatus.

Figure 2:
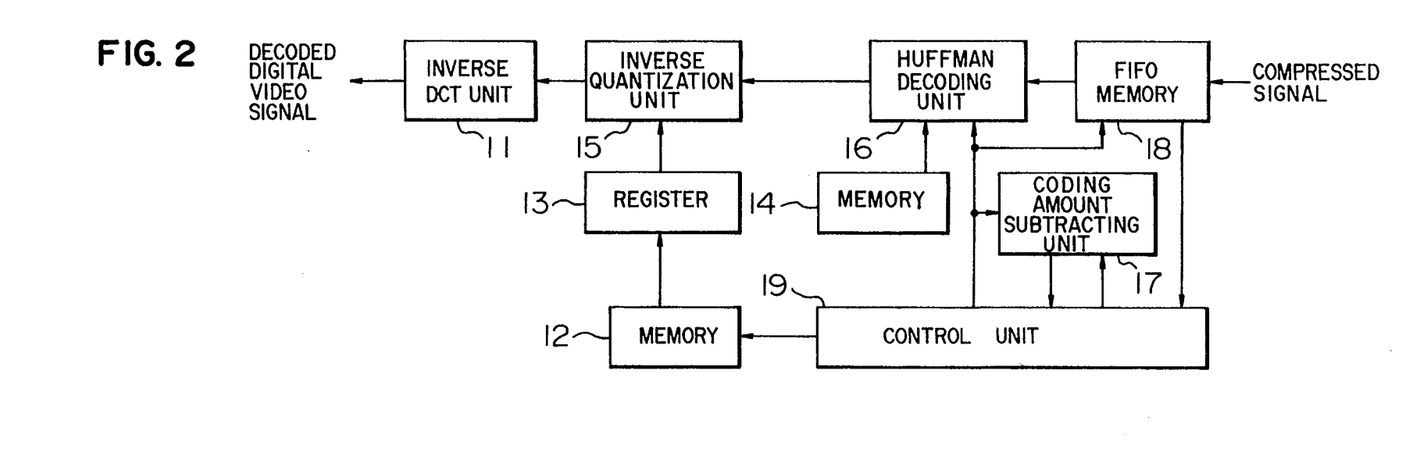
FIG. 2 is a block diagram showing an example of a decoding unit of the image signal compression apparatus according to the embodiment of the present invention.

FIG. 2 shows an example of a decoding unit of the image signal compression apparatus according to the embodiment of the present invention. This decoding unit decodes the compression code generated by the encoding unit shown in FIG. 1.

As shown in FIG. 2, the decoding unit of the above-mentioned image signal compression apparatus includes an inverse discrete cosine transform unit (inverse DCT unit) 11, a memory 12 for storing therein a plurality of quantization tables which are the same as those of the plurality of quantization tables (Q tables) stored in the memory 2 shown in FIG. 1, a register 13 to which one of the plurality of quantization tables is transferred, a memory 14 for storing therein decoding tables corresponding to Huffman coding tables stored in the memory 4 shown in FIG. 1, an inverse quantization unit 15, a Huffman decoding unit 16, a coding amount subtracting unit 17, an FIFO memory 18 and a control unit 19 for controlling the aforesaid units.

Operation of the decoding unit of this image signal compression apparatus will be described below.

The compression code is temporarily stored in the FIFO memory 18. The format of data stored in the FIFO memory 18 is the same as that of FIFO memory 8 FIG. 3. The table identification data 21a is read out from the FIFO memory 18 by the control unit 19, and this table identification data 21a is supplied to the memory 12 as the selection signal. Thus, selected one corresponding to the table identification data 21a is selected from the plurality of quantization tables stored in the memory 12 and then transferred to the register 13. The total amount data 21b is read out from the FIFO memory 18 by the control unit 19 and this total amount data 21b is transferred to a register (not shown) provided within the coding amount subtracting unit 17. The coding amount subtracting unit 17 subtracts the value of the register provided within the coding amount subtracting unit 17 each time a pulse-shaped read control signal (data representative of a predetermined amount is read out from the FIFO memory 18 at each pulse of this signal) supplied from the control unit 19 to the FIFO memory 18 is input since the coded data 21c starts being read out from the FIFO memory 18. When the subtracted value becomes "0" (i.e., when the data is the last data of the coded data 21c), the coded amount subtracting unit 17 informs such a value through the control unit 19, to the Huffman decoding unit 16. Therefore, the coded data 21c that is the variable length code can be identified by the coding amount subtracting unit 17.

The Huffman decoding unit 16 obtains decoded data corresponding to the coded data 21c by processing the coded data 21c identified by the coding amount subtracting unit 17 in a Huffman decoding fashion with reference to the above-mentioned decoding table stored in the memory 14. The inverse quantization unit 15 obtains a decoding discrete cosine coefficient by processing the decoded data in an inverse quantization fashion with reference to the quantization data transferred to the register 13. The inverse discrete cosine transform unit 11 obtains a decoding digital image signal by processing the above-mentioned decoded discrete cosine coefficient in an inverse discrete cosine transform fashion.

The decoding of the compression signal corresponding to the picture P1 is ended by the above-mentioned operation, and similar operation is sequentially effected on the compression signal corresponding to the picture P2, the compression signal corresponding to the picture P3, . . . , in a real time fashion.

The above-mentioned decoding unit shown in FIG. 2 can be used as a part of an image data reproducing apparatus and an image data receiving apparatus. Incidentally, a combination of the encoding unit shown in FIG. 1 and the decoding unit shown in FIG. 2 can be used in an image data recording and reproducing apparatus which can record and reproduce an image signal on and from a hard disk or the like. In this case, circuits shown in FIGS. 1 and 2 can be made common. For example, the memory 2, the register 3 and the FIFO memory 8 in FIG. 1 can be made common to the memory 12, the register 13 and the FIFO memory 18 shown in FIG. 2, respectively. Furthermore, portions of the discrete cosine transform unit 1, the Huffman coding unit 6 and the control unit 9 shown in FIG. 1 can be made common to portions the discrete cosine transform unit 11, the Huffman coding unit 16 and the control unit 19 shown in FIG. 2, respectively.

Although the image signal compression apparatus according to the present invention is not compatible with other JPEG codes, the image signal compression apparatus of the present invention can vary the quantization table (Q table) similarly to the conventional image signal compression apparatus and can offer the following advantages.

The compression codes provided by the image signal compression apparatus according to the present invention are composed of the coded data 21c, 22c, 23c, the total amount data 21a, 22a, 23a and the table identification data 21b, 22b, 23b and the identification data "00" are not added to the coded data 21c, 22c and 23c unlike the compression codes provided by the conventional image signal compression apparatus. Therefore, according to the image signal compression apparatus of the embodiment of the present invention, although the coded data are variable length code data 21c, 22c and 23c, the amount of the compression code of one picture can be predicted to some extent. Thus, when the moving picture is compressed and recorded in a real time fashion, it is possible to prevent such an accident that the transfer rate of the image recording apparatus (image recording medium) is made temporarily insufficient so that data of a frame cannot be recorded.

Further, according to the above-mentioned image signal compression apparatus of the present invention, since the identification data "00" the marker code, the quantization table itself and the Huffman code table itself are not included in the compression codes, the data compression ratio can be increased. Therefore, as compared with the conventional compression apparatus, the encoding effect relative to the same picture quality is high. Also from this standpoint, it is possible to reduce further the possibility that the transfer rate of the image recording apparatus (image recording medium) is temporarily low so that data of a frame cannot be recorded.

Furthermore, according to the above-mentioned image signal compression apparatus, since the identification data "00" and the marker code are not included in the compression codes, the processing that is required by the identification data "00" and the marker code according to the prior art becomes unnecessary. Therefore, the circuit arrangement of the above-mentioned image signal compression apparatus can be simplified and the image signal compression apparatus can be made inexpensive.

In addition, if the selection signal shown in FIG. 1 is set properly, then the selection of the quantization table can be dynamically changed in response to the code amount or the like during the processing, thereby making it possible to control the code amount.

The following table 1 shows results obtained when the characteristics of the image signal compression apparatus according to the embodiment of the present invention and those of the conventional image signal compression apparatus are compared each other.

TABLE 1

|  | inventive apparatus | conventional apparatus |
| --- | --- | --- |
| compatibility with other JPEG codes | not compatible | compatible |
| change of Q table | possible | possible |
| control of coded amount | possible | impossible |
| marker code processing | not required | required |
| coding effect for the same picture quality | high | low |

Study of the above-mentioned table 1 reveals that the marker code processing becomes unnecessary, the compression ratio can be increased, the coding and the decoding can be effected by the simple processing and that an image can be efficiently recorded and reproduced in the form of compressed data.

Incidentally, the present invention is not limited to the aforesaid embodiment and the following variant is also possible. For example, while the Huffman code is used as the variable length code as described above, the present invention is not limited thereto and other arbitrary variable length codes, such as a run length code or the like, can be employed similarly.

What is claimed is:

1. An image signal compression apparatus for obtaining compression codes of a digitally encoded image signal per a predetermined data amount, said apparatus comprising:

discrete cosine transform means for obtaining discrete cosine coefficients by processing the digitally encoded image signal per unit of said predetermined data amount in a discrete cosine transform fashion;

first memory means for storing therein a plurality of quantization tables having quantization accuracies different from each other;

second memory means for storing therein a variable length code table;

quantization means for quantizing said discrete cosine coefficients with reference to a selected one of said plurality of quantization tables;

variable length encoding means for obtaining variable length encoded data by processing said discrete cosine coefficients quantized by said quantization means in a variable length coding fashion with reference to said variable length code table stored in said second memory means;

means for obtaining total amount data indicative of a total amount of said variable length encoded data corresponding to said predetermined data amount of the digitally encoded image signal;

third memory means for temporarily storing therein said variable length encoded data, said total amount data and table identification data indicative of said selected one of said plurality of quantization tables; and means for reading out said table identification data, said total amount data and said variable length encoded data from said third memory means in a predetermined order as said compression codes.

2. An image signal compression apparatus according to claim 1, wherein:

said variable length code table includes a Huffman coding table; and said variable length encoding means includes means for obtaining said variable length encoded data by processing said discrete cosine coefficients quantized by said quantization means in a Huffman coding fashion with reference to said Huffman coding table.

3. An image signal compression apparatus according to claim 1, further comprising:

fourth memory means for temporarily storing therein said compressing codes;

first read means for reading out said table identification data included in said compression codes stored in said fourth memory means;

second read means for reading out said total amount data included in said compression codes stored in said fourth memory means, said total amount data being associated with said table identification data read out by said first read means;

selection means for selecting one quantization table indicated by said table identification data read out by said first read means among said plurality of quantization tables;

identification means for identifying said variable length encoded data included in said compression codes stored in said fourth memory means on the basis of said total amount data read out by said second read means, said variable length encoded data being associated with said table identification data read out by said first read means;

fifth memory means for storing therein a variable length decoding table which has an inverse relation to said variable length code table;

decoding means for obtaining said quantized discrete cosine coefficients by decoding said variable length encoded data identified by said identification means with reference to said variable length decoding table;

inverse quantization means for obtaining said discrete cosine coefficients by processing said quantized discrete cosine coefficients in an inverse quantization fashion with reference to said one quantization table selected by said selection means; and means for obtaining said digitally encoded image signal by processing said discrete cosine coefficients in an inverse discrete cosine transform fashion.

4. A decoding apparatus for decoding compression codes obtained by an image signal compression apparatus for obtaining said compression codes for a digitally encoded image signal per a predetermined data amount, said image signal compression apparatus including discrete cosine transform means for obtaining discrete cosine coefficients by processing the digitally encoded image signal per unit of said predetermined data amount in a discrete cosine transform fashion; first memory means for storing therein a plurality of quantization tables having quantization accuracies different from each other; second memory means for storing therein a variable length code table; quantization means for quantizing said discrete cosine coefficients with reference to a selected one of said plurality of quantization tables; variable length encoding means for obtaining variable length encoded data by processing said discrete cosine coefficients quantized by said quantization means in a variable length coding fashion with reference to said variable length code table stored in said second memory means; means for obtaining total amount data indicative of a total amount of said variable length encoded data corresponding to said predetermined data amount of the digitally encoded image signal; third memory means for temporarily storing therein said variable length encoded data, said total amount data and table identification data indicative of said selected one of said plurality of quantization tables; and means for reading out said table identification data, said total amount data and said variable length encoded data from said third memory means in a predetermined order as said compression codes, said decoding apparatus comprising:

fourth memory means for temporarily storing therein said compression codes;

first read means for reading out said table identification data included in said compression codes stored in said fourth memory means;

second read means for reading out said total amount data included in said compression codes stored in said fourth memory means, said total amount data being associated with said table identification data read out by said first read means;

selection means for selecting one quantization table indicated by said table identification data read out by said first read means among said plurality of quantization tables;

identification means for identifying said variable length encoded data included in said compression codes stored in said fourth memory means on the basis of said total amount data read out by said second read means, said variable length encoded data being associated with said table identification data read out by said first read means;

fifth memory means for storing therein a variable length decoding table which has an inverse relation to said variable length code table;

decoding means for obtaining said quantized discrete cosine coefficients by decoding said variable length encoded data identified by said identification means with reference to said variable length decoding table;

inverse quantization means for obtaining said discrete cosine coefficients by processing said quantized discrete cosine coefficients in an inverse quantization fashion with reference to said one quantization table selected by said selection means; and means for obtaining said digitally encoded image signal by processing said discrete cosine coefficients in an inverse discrete cosine transform fashion.

5. An image signal compression method for obtaining compression codes of a digitally encoded image signal per a predetermined data amount, said method comprising the steps of:

(a) obtaining discrete cosine coefficients by processing the digitally encoded image signal per unit of said predetermined data amount in a discrete cosine transform fashion;

(b) preparing a plurality of quantization tables having quantization accuracies different from each other;

(c) preparing a variable length code table;

(d) quantizing said discrete cosine coefficients with reference to a selected one of said plurality of quantization tables;

(e) obtaining variable length encoded data by processing said quantized discrete cosine coefficients in a variable length coding fashion with reference to said variable length code table;

(f) obtaining total amount data indicative of a total amount of said variable length encoded data corresponding to said predetermined data amount of the digitally encoded image signal;

(g) temporarily storing said variable length encoded data, said total amount data and table identification data indicative of said selected one of said plurality of quantization tables in a memory; and (h) reading out said table identification data, said total amount data and said variable length encoded data from said memory in a predetermined order as said compression codes.

6. An image signal compression method according to claim 5, wherein:

said variable length code table includes a Huffman coding table; and said step (e) for obtaining said variable length encoded data includes a step of obtaining said variable length encoded data by processing said quantized discrete cosine coefficients in a Huffman coding fashion with reference to said Huffman coding table.

7. An image signal compression method according to claim 5, further comprising the steps of:

temporarily storing said compression codes in a second memory;

reading out said table identification data included in said compression codes stored in said second memory;

reading out said total amount data included in said compression codes stored in said second memory, said total amount data being associated with said table identification data read out from said second memory;

selecting one quantization table indicated by said table identification data read out from said second memory among said plurality of quantization tables;

identifying said variable length encoded data included in said compression codes stored in said second memory on the basis of said total amount data read out from said second memory, said variable length encoded data being associated with said table identification data read out from said second memory;

preparing a variable length decoding table which has an inverse relation to said variable length code table;

obtaining said quantized discrete cosine coefficients by decoding said identified variable length encoded data with reference to said variable length decoding table;

obtaining said discrete cosine coefficients by processing said quantized discrete cosine coefficients in an inverse quantization fashion with reference to said one quantization table selected among said plurality of quantization tables; and obtaining said digitally encoded image signal by processing said discrete cosine coefficients in an inverse discrete cosine transform fashion.

8. A decoding method of decoding compression codes obtained by an image signal compression method for obtaining said compression codes for a digitally encoded image signal per a predetermined data amount, said image compression method including obtaining discrete cosine coefficients by processing the digitally encoded image signal per unit of said predetermined data amount in a discrete cosine transform fashion; preparing a plurality of quantization tables having quantization accuracies different from each other; preparing a variable length code table; quantizing said discrete cosine coefficients with reference to a selected one of said plurality of quantization tables; obtaining variable length encoded data by processing said quantized discrete cosine coefficients in a variable length coding fashion with reference to said variable length code table; obtaining total amount data indicative of a total amount of said variable length encoded data corresponding to said predetermined data amount of the digitally encoded image signal; temporarily storing said variable length encoded data, said total amount data and table identification data indicative of said selected one of said plurality of quantization tables in a memory; and reading out said table identification data, said total amount data and said variable length encoded data from said memory in predetermined order as said compression codes, said decoding method comprising the steps of:
(a) temporarily storing said compression codes in a second memory;
(b) reading out said table identification data included in said compression codes stored in said second memory;
(c) reading out said total amount data included in said compression codes stored in said second memory, said total amount data being associated with said table identification data read out from said second memory;
(d) selecting one quantization table indicated by said table identification data read out from said second memory among said plurality of quantization tables;
(e) identifying said variable length encoded data included in said compression codes stored in said second memory on the basis of said total amount data read out from said second memory, said variable length encoded data being associated with said table identification data read out from said second memory;
(f) preparing a variable length decoding table which has an inverse relation to said variable length code table;
(g) obtaining said quantized discrete cosine coefficients by decoding said identified variable length encoded data with reference to said variable length decoding table;
(h) obtaining said discrete cosine coefficients by processing said quantized discrete cosine coefficients in an inverse quantization fashion with reference to said one quantization table selected among said plurality of quantization tables; and
(i) obtaining said digitally encoded image signal by processing said discrete cosine coefficients in an inverse discrete cosine transform fashion.

9. An image signal compression apparatus according to claim 1, wherein said predetermined data amount of the digitally encoded image signal corresponds to one field picture.

10. An image signal compression apparatus according to claim 2, wherein said predetermined data amount of the digitally encoded image signal corresponds to one field picture.

11. An image signal compression apparatus according to claim 3, wherein said predetermined data amount of the digitally encoded image signal corresponds to one field picture.

12. An image signal compression method according to claim 5, wherein said predetermined data amount of the digitally encoded image signal corresponds to one field picture.

13. An image signal compression method according to claim 6, wherein said predetermined data amount of the digitally encoded image signal corresponds to one field picture.

14. An image signal compression method according to claim 7, wherein said predetermined data amount of the digitally encoded image signal corresponds to one field picture.

15. An image signal compression apparatus according to claim 9, further comprising means for selecting one of said plurality of quantization tables while said quantization means quantizes said discrete cosine coefficients obtained in a vertical blanking period of the digitally encoded image signal.

16. An image signal compression apparatus according to claim 10, further comprising means for selecting one of said plurality of quantization tables while said quantization means quantizes said discrete cosine coefficients obtained in a vertical blanking period of the digitally encoded image signal.

17. An image signal compression apparatus according to claim 11, further comprising means for selecting one of said plurality of quantization tables while said quantization means quantizes said discrete cosine coefficients obtained in a vertical blanking period of the digitally encoded image signal.

18. An image signal compression method according to claim 12, further comprising the step of selecting one of said plurality of quantization tables while said quantizing step quantizes said discrete cosine coefficients obtained in a vertical blanking period of the digitally encoded image signal.

19. An image signal compression method according to claim 13, further comprising the step of selecting one of said plurality of quantization tables while said quantizing step quantizes said discrete cosine coefficients obtained in a vertical blanking period of the digitally encoded image signal.

20. An image signal compression method according to claim 14, further comprising the step of selecting one of said plurality of quantization tables while said quantizing step quantizes said discrete cosine coefficients obtained in a vertical blanking period of the digitally encoded image signal.

* * * * *